United States Patent
Mola et al.

(10) Patent No.: US 7,360,375 B2
(45) Date of Patent: Apr. 22, 2008

(54) CLIMATE CONTROL SYSTEM WITH A VAPOUR COMPRESSION CIRCUIT COMBINED WITH AN ABSORPTION CIRCUIT

(75) Inventors: Stefano Mola, Piossasco (IT); Giulio Lo Presti, Viareggio (IT)

(73) Assignee: CRF Societa Consortile per Azioni, Orbassano (Turin) (IT)

( * ) Notice: Subject to any disclaimer, the term of this patent is extended or adjusted under 35 U.S.C. 154(b) by 282 days.

(21) Appl. No.: 10/564,640

(22) PCT Filed: Jul. 14, 2004

(86) PCT No.: PCT/EP2004/007782

§ 371 (c)(1),
(2), (4) Date: Jan. 13, 2006

(87) PCT Pub. No.: WO2005/014317

PCT Pub. Date: Feb. 17, 2005

(65) Prior Publication Data
US 2006/0156761 A1 Jul. 20, 2006

(30) Foreign Application Priority Data
Jul. 15, 2003 (IT) .......................... TO2003A0547

(51) Int. Cl.
*F25D 23/00* (2006.01)
*F25D 17/00* (2006.01)
*F25D 17/02* (2006.01)

(52) U.S. Cl. .............................. 62/271; 62/333; 62/434

(58) Field of Classification Search .................... 62/93, 62/94, 185, 271, 238.6, 333
See application file for complete search history.

(56) References Cited

U.S. PATENT DOCUMENTS

| | | | | |
|---|---|---|---|---|
| 3,102,399 A | * | 9/1963 | Meckler | 62/271 |
| 4,259,849 A | * | 4/1981 | Griffiths | 62/271 |
| 4,430,864 A | * | 2/1984 | Mathiprakasam | 62/94 |
| 4,819,444 A | * | 4/1989 | Meckler | 62/238.6 |
| 4,903,503 A | * | 2/1990 | Meckler | 62/238.3 |
| 4,984,434 A | | 1/1991 | Peterson et al. | |
| 5,421,169 A | | 6/1995 | Benedict | |
| 5,816,065 A | * | 10/1998 | Maeda | 62/271 |
| 5,950,442 A | * | 9/1999 | Maeda et al. | 62/175 |
| 6,134,903 A | * | 10/2000 | Potnis et al. | 62/271 |
| 6,237,354 B1 | * | 5/2001 | Cromer | 62/271 |
| 6,494,053 B1 | * | 12/2002 | Forkosh et al. | 62/271 |
| 6,539,728 B2 | | 4/2003 | Korin | |
| 6,546,746 B2 | * | 4/2003 | Forkosh et al. | 62/271 |

* cited by examiner

*Primary Examiner*—Mohammad M. Ali
(74) *Attorney, Agent, or Firm*—Sughrue Mion, PLLC

(57) ABSTRACT

The system (SC) includes a first, vapour compression circuit (A), including a compressor (1) with its output connected to a condenser (2; 2') followed by an expansion device (4) and an evaporator (5; 16) having its output connected to the in of the compressor (1); a second, absorption circuit (B) with a hygroscopic solution flowing through it in operation and including a regenerator (11) with semipermeable membranes operable to allow the said solution to give up moisture (water) to a first airflow flowing in the regenerator (11) in operation, a dehumidifier (13) with semipermeable membranes arranged downstream of the regenerator (11) and operable to allow a second airflow to give up moisture to the hygroscopic solution, and a circulation pump (14). The first and second circuits (A, B) are connected by at least one heat exchanger (5) in which the hygroscopic solution flowing through the second circuit (B) gives up heat to the cooling fluid flowing through the first circuit (A).

9 Claims, 4 Drawing Sheets

CLIMATE CONTROL SYSTEM WITH A VAPOUR COMPRESSION CIRCUIT COMBINED WITH AN ABSORPTION CIRCUIT

The present invention relates to a climate control system for an environment, such as the passenger compartment of a motor vehicle or a living or other activities.

In the prior art, climate control systems typically include a vapour compression circuit, including a compressor with its delivery connected to a condenser, with an expansion device and an evaporator downstream, the output of this last connected to the intake of the compressor.

These systems suffer from a problem with evacuating water that has accumulated as a result of the condensation of moisture in the air being treated.

One object of the present invention is to provide a climate control system which provides an effective solution to this problem.

Current so-called 'split' climate control systems for domestic use call for the evaporator to be installed in the room to be treated, while the condenser is typically positioned outside. This arrangement involves the use of rather long connecting pipes for linking the various components. On the one hand, this means that a considerable amount of cooling fluid is required, while on the other it carries the disadvantage that cooling fluid can become dispersed in the environment being treated in the event of a leak.

An additional object of the present invention is to provide a system which overcomes these disadvantages.

These and other objects are achieved according to the present invention by providing a climate control system of which the main characteristics are defined in the appended claim 1.

Figure 1:
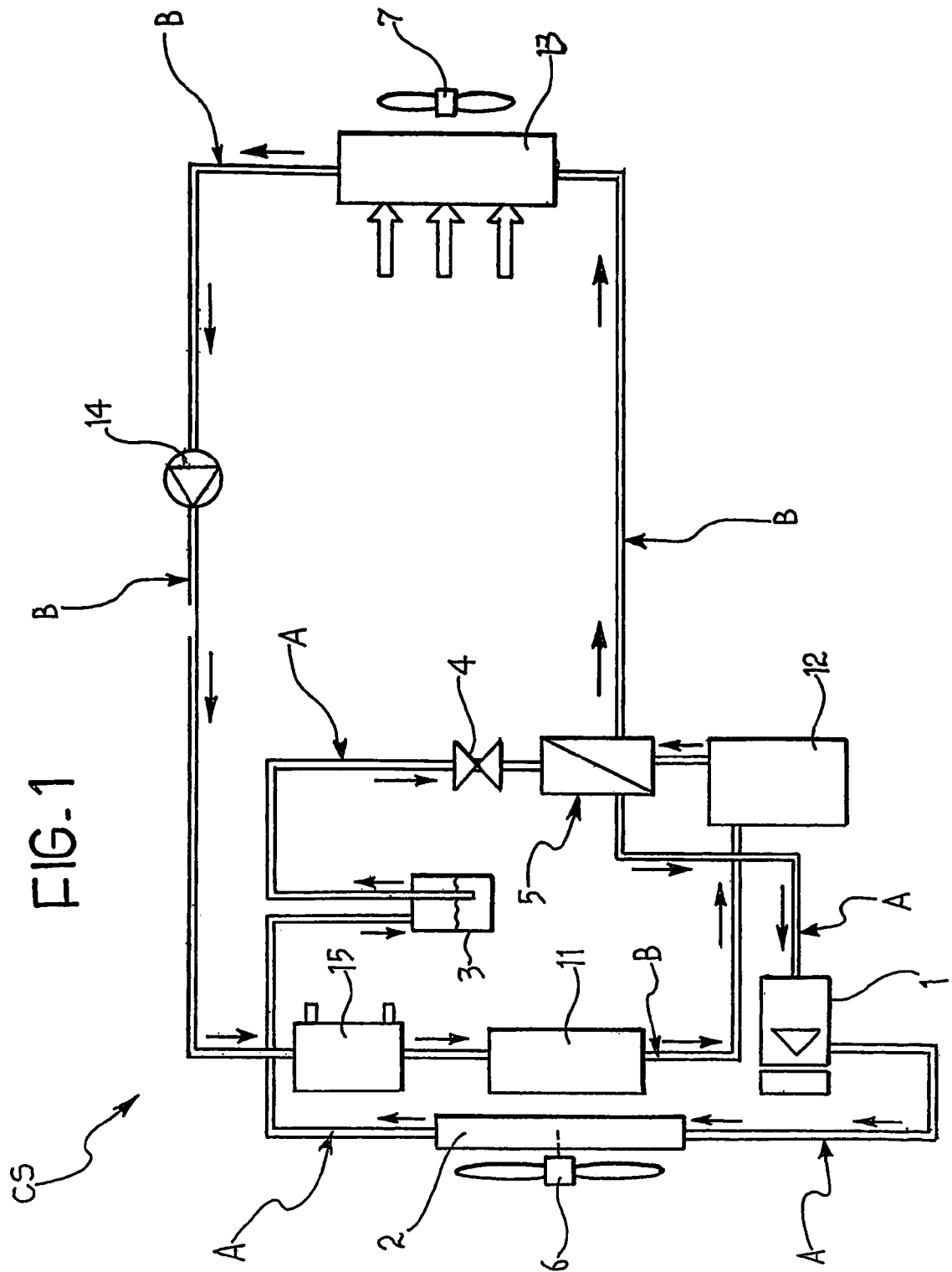
Figure 2:
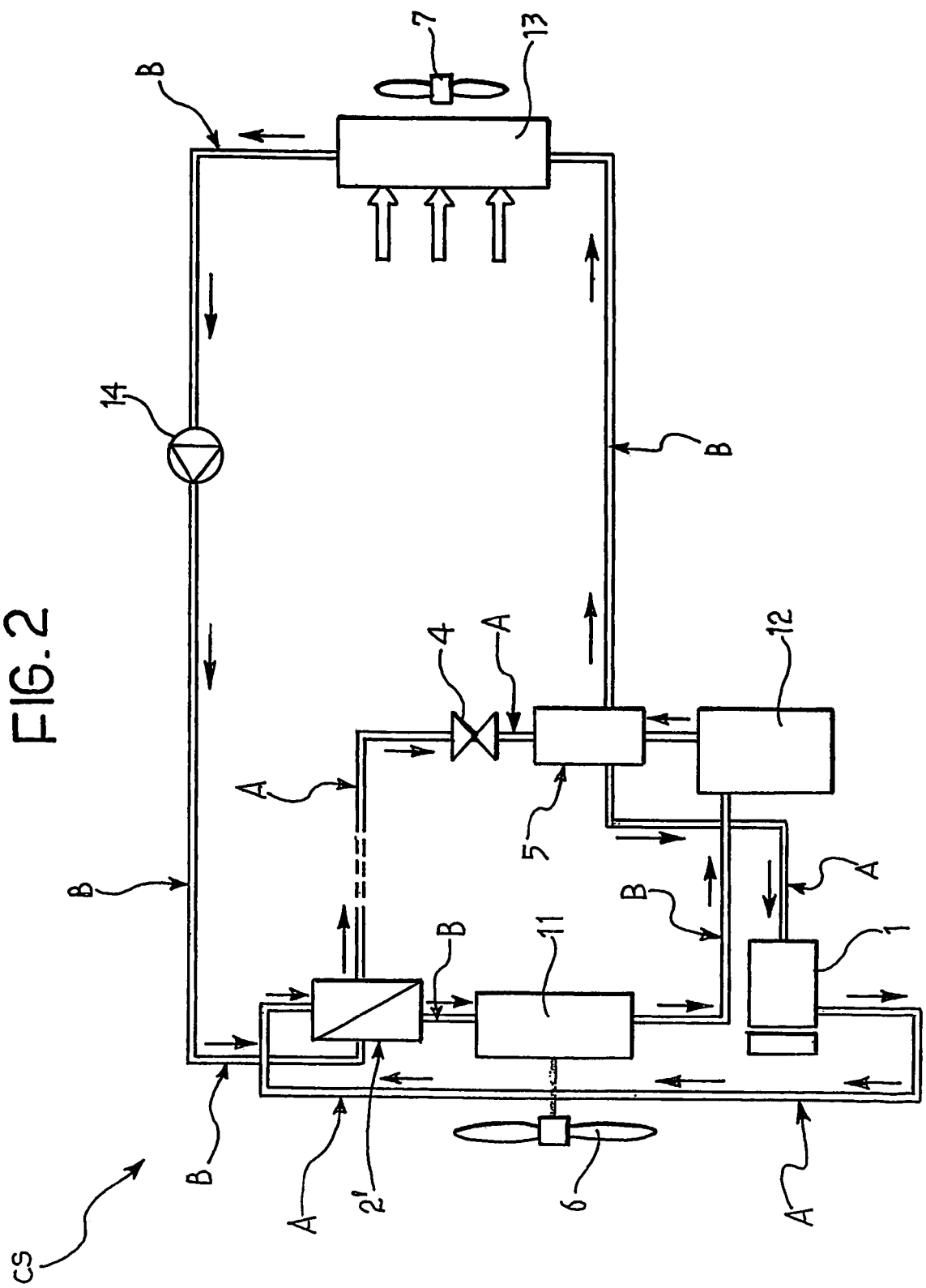
Figure 3:
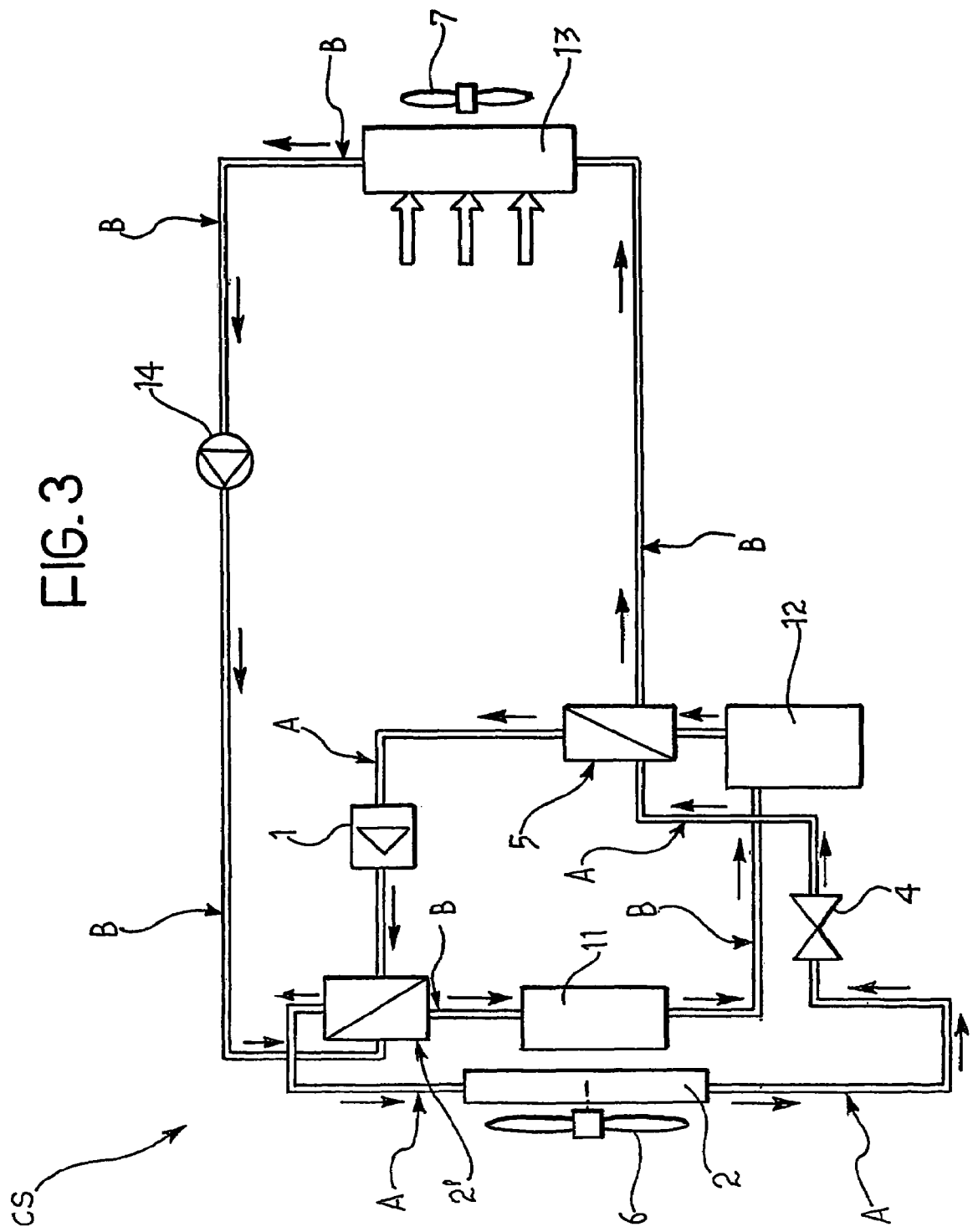
Figure 4:
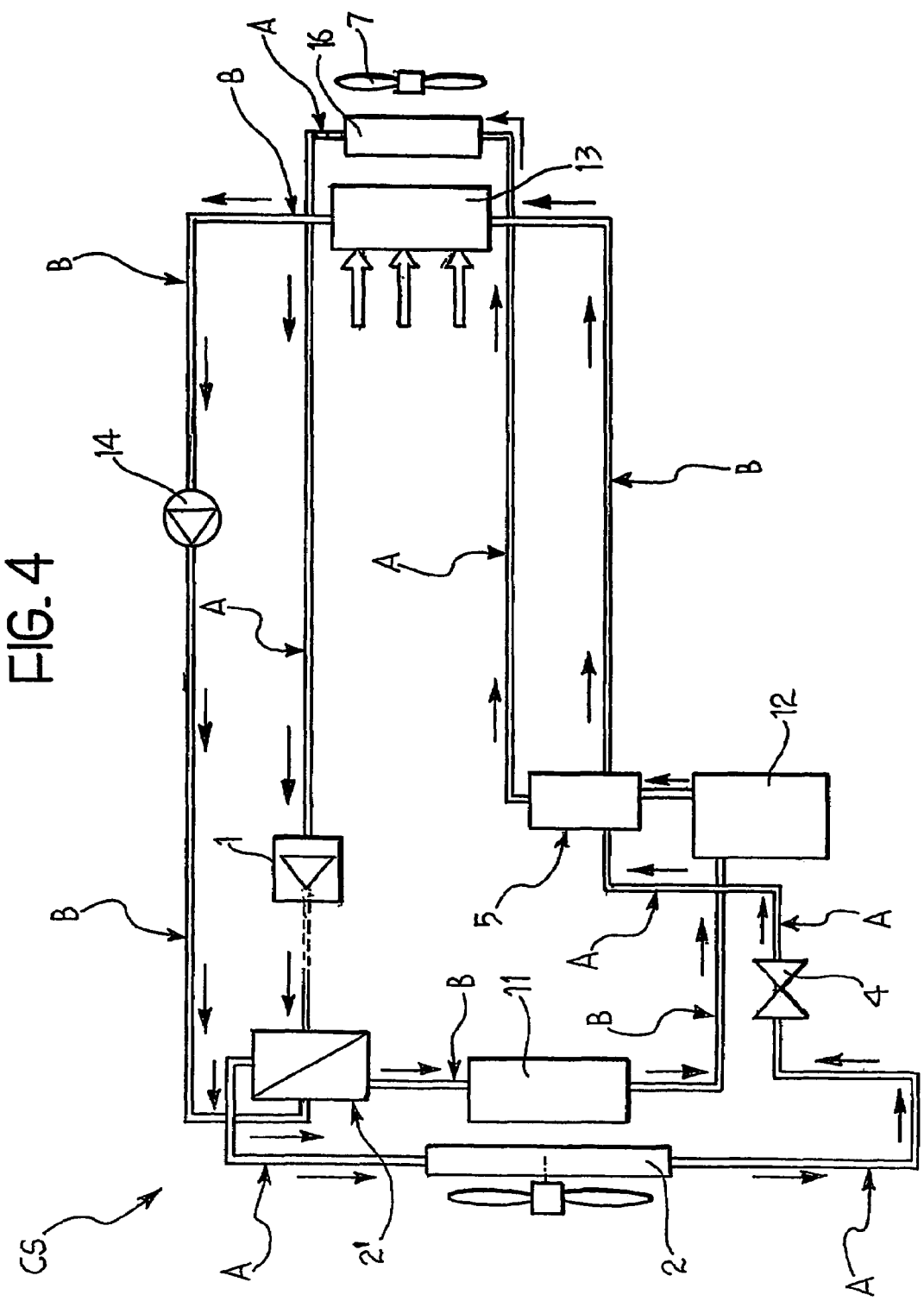

Additional characteristics and advantages of the invention will become apparent from the detailed description which follows, provided purely by way of non-limitative example, with reference to the appended drawings, in which:

FIG. 1 is a diagram showing a first embodiment of a climate control system of the invention; and FIGS. 2 to 4 are diagrams of alternative embodiments of the invention.

In FIG. 1, a climate control system according to the invention is generally indicated CS.

This system includes a first vapour compression circuit A, connected to or combined with a second absorption circuit B, including exchangers with semi-permeable membranes.

The refrigeration circuit A includes a compressor 1, the output or delivery of which is connected to a condenser 2. The output of this is connected to an expansion device 4, (possibly) by way of a dryer 3.

A plate heat exchanger 5, arranged between the expansion valve 4 and the intake of the compressor 1, acts as an evaporator. This heat exchanger in fact couples together the two circuits A and B, as will be seen better hereinbelow.

A dehydrating fluid (a hygroscopic solution), such as an aqueous solution of LiCl, TEG, LiBr, $CaCl_2$, glycerine, or the like flows through the circuit B. This circuit includes a regenerator 11, constituted by a heat exchanger incorporating semipermeable membranes, operable to confine a fluid in its liquid state but which a fluid in its gaseous phase, in particular vapour, can pass through.

For convenience, the regenerator 11 is positioned adjacent the condenser 2 and an associated electric fan 6. If the climate control system is associated with the passenger compartment of a motor vehicle, the regenerator 11 and the condenser 2 can conveniently be arranged behind the radiator of the cooling fluid circuit of the engine of the vehicle.

Downstream of the regenerator 11, the absorption circuit B passes through the heat exchanger 5, after first passing through a tank 12 acting as hygrometric absorbor, if one is provided.

Downstream of the heat exchanger 5, the absorption circuit B includes a heat exchanger 13, also incorporating semipermeable membranes and acting as a dehumidifier. An electric fan 7 is associated with this heat exchanger 13 for generating a flow of air (indicated schematically by a plurality of arrows in FIG. 1) into the environment being treated. In the case of a climate control system in the passenger compartment of a motor vehicle, the heat exchanger 13 can be arranged, for example, in the treated air distribution ducts, within the fascia of the vehicle.

A circulation pump, indicated 14, is arranged downstream of the heat exchanger 13 in order, in operation, to keep the fluid flowing through the absorption circuit B, towards the regenerator 11.

In the case of a climate control system for the passenger compartment of a motor vehicle, it is convenient if a heat exchanger 15 of a liquid/liquid type is arranged between the output or delivery of the pump 14 and the intake of the regenerator 11, for exchanging heat between the fluid flowing through the absorption circuit B and the liquid flowing through the engine-cooling circuit of the motor vehicle.

In operation, the vapour compression circuit A operates in a strictly conventional manner. There will therefore be no further description of the operation of this circuit.

The absorption circuit B operates as follows.

A hygroscopic solution, at a low temperature and a high moisture (water) concentration, flows into the dehumidifying heat exchanger 13. Passing through this dehumidifying heat exchanger, the solution comes into contact with the relatively warm and humid air which needs to be cooled and dehumidified before it is released into the environment being treated. The concentration gradient in the hygroscopic solution and that contained in the air means that part of the water vapour present in the air passes into the hygroscopic solution through the semipermeable membrane or membranes of the heat exchanger 13. At the same time, when it comes into contact with the relatively colder hygroscopic solution, the temperature of this air also falls.

On the other hand, the temperature of the hygroscopic solution increases, both through coming into contact with the relatively warmer air and because the absorption process is of an exothermic type.

At the output of the dehumidifying exchanger 13, the hygroscopic solution is therefore at a lower concentration and a higher temperature than it was on entering.

Downstream of the circulation pump 14, the heat exchanger 15, if fitted, is acts to raise the temperature of the hygroscopic solution, thereby facilitating the subsequent regeneration process which takes place in the heat exchanger 11. Inside the exchanger 15 the concentration of the hygroscopic solution remains unchanged, since there is no contact between it and the outside air.

The hygroscopic solution then enters the regenerator exchanger 11 which, in operation, has a flow of air through it, generated, at least in part, by the electric fan 6. The air flowing into the regenerator exchanger 11 is heated, as a result of the heat exchanged by the condenser 2 of the circuit A. On contact with this heated air, the hygroscopic solution in the regenerator 11 releases part of the water contained in it into this air. The concentration of the hygroscopic solution therefore increases.

Downstream of the regenerator exchanger 11, the hygroscopic solution is therefore at a high temperature and a high concentration and when it enters the plate exchanger 5 it gives up heat to the cooling fluid which is evaporating there.

On exiting the heat exchanger 5, the hygroscopic solution is therefore once again at a low temperature and a high concentration.

FIG. 2 shows a first variant embodiment of the climate control system of the invention. In this drawing, components and elements which have already been described have been given the same reference numbers or letters.

The system of FIG. 2 differs essentially from that of FIG. 1 in that a heat exchanger 2' is arranged in the vapour compression circuit A between the compressor 1 and the expansion device 4 to act as a condenser in which, as it condenses, the cooling fluid gives up heat to the hygroscopic solution flowing through the circuit B, in the portion between the circulation pump 14 and the regenerator 11.

The system shown in FIG. 2 operates in the same way as that shown in FIG. 1 so its operation will not be described again in detail.

In a variant, not illustrated, of the system shown in FIG. 2, an arrangement could be devised whereby different quantities of hygroscopic solution or of dehydrating fluid were carried in the dehumidifying and regeneration portions respectively of circuit B. In such an event, the dehydrating fluid could be drawn from the tank 12 by two different pumps and delivered into two different sub-circuits: the diluted dehydrating fluid returning from the dehumidifier and the concentrated dehydrating fluid returning from the regenerator (which, by the way, would be at different temperatures) would be mixed again on their return to the tank 12.

Should the energy generated by the step in which the cooling fluid is condensed in the circuit A be greater than that required to heat the dehydrating fluid in order to facilitate the regeneration thereof in the regenerator 11, yet another arrangement could be envisaged: the exchanger 2' acting as condenser could exchange heat with the dehydrating fluid, as in the system shown in FIG. 2, and then dissipate any excess energy into the air.

FIG. 3 shows a further variant of the invention. In this drawing components or elements which have already been described have been given the same reference numbers or letters.

In the system of FIG. 3, the absorption circuit B is the same as that described with reference to the system of FIG. 2.

In the vapour compression circuit A of the system of FIG. 3 however, the condensation heat exchange first includes a gas/liquid exchange between the cooling fluid (in its gaseous phase on exiting the compressor 1) and the dehydrating fluid or hygroscopic solution and then a heat exchange between the cooling fluid and the air, in the actual condenser, indicated 2.

In a variant which is not illustrated, the condensation heat exchange sequence could be reversed, with an exchange first between the cooling fluid and the air, followed by a liquid/liquid exchange between the extra-cooled cooling fluid and the dehydrating fluid.

FIG. 4 shows yet another variant. In this drawing components or elements which have already been described are again given the same reference numbers or letters.

In the system of FIG. 4, the absorption circuit B is the same as those of FIGS. 2 and 3.

The vapour compression circuit A is similar to that of the system according to FIG. 3, differing in that the cooling fluid is evaporated partly by the heat exchanger 5 and partly by an additional heat exchanger or actual evaporator, indicated 16 and conveniently positioned near the dehumidifying exchanger 13, in particular downstream thereof. In the system shown in FIG. 4, the alternative arrangements with regard to dividing up the condensing heat exchange of the cooling fluid remain valid.

The climate control systems according to the invention as described above effectively resolve the problem of dripping condensation water.

When used to control the climate in domestic environments or the like, the arrangements described above with reference to FIGS. 1 to 3 make it possible to fit just the dehumidifier in the space to be treated, with all other devices being arranged outside. In this event, only the pipes carrying the dehydrating fluid (hygroscopic solution) need be used to connect the portion of the system arranged in the environment to be treated with the external portion. These pipes are less trouble to install than those carrying gas, which would need to be used for connection in so-called 'split' systems of the prior art. In addition, should a leak occur into the environment being treated, only the hygroscopic solution is dispersed, rather than cooling gas.

Naturally, the principle of the invention remaining unchanged, embodiments and manufacturing details may vary widely from those described and illustrated purely by way of non-limitative example, without thereby departing from the scope of the invention, as claimed in the appended Claims.

The invention claimed is:

1. A system (SC) for controlling the climate in an environment, including
    a first, vapour compression circuit (A), including a compressor (1) the output of which is connected to a condenser (2; 2') followed by an expansion device (4) and an evaporator (5; 16) the output of which is connected to the intake of the compressor (1);
    a second, absorption circuit (B) which, in operation, has a hygroscopic solution flowing through it and includes a semipermeable-membrane regenerator (11) operable to allow the said solution to give up moisture (water) to a first airflow flowing in the regenerator (11) during operation, a dehumidifier with semipermeable membranes (13), arranged downstream of the regenerator (11) and operable to allow moisture to pass from a second airflow to the hygroscopic solution, and a circulation pump (14);
    the first and the second circuits (A, B) being connected by at least one heat exchanger (5) in which the hygroscopic solution flowing through the second circuit (B) give up heat to the cooling fluid flowing through the first circuit (A).

2. A system according to claim 1, in which the said heat exchange (5) acts as evaporator in the aforesaid first circuit (A).

3. A system according to claim 1, in which the regenerator (11) of the second circuit (B) is arranged near the condenser (2) of the first circuit (A), and a fan (6) is provided to generate a flow of air first into the condenser (2) and then into the regenerator (11).

4. A system according to claim 1, for the climate control of the passenger compartment of a vehicle with an internal combustion engine with a cooling circuit associated therewith;
    a liquid/liquid heat exchanger (see FIG. 1; 15) being interposed between the dehumidifier (13) and the regenerator (11) in the second circuit (B) for causing the cooling liquid of the engine to give up heat to the hygroscopic solution flowing through the said second circuit (B).

5. A climate control system according to claim 1, in which the first and the second circuits (A, B) are connected by an additional heat exchanger (2') in which the fluid flowing through the first circuit (A) gives up heat to the fluid flowing through the second circuit (B).

6. A climate control system according to claim 5, in which the said additional heat exchanger (2') is arranged in the first circuit (A) between the compressor (1) and the expansion device (4), and in the second circuit (B) is arranged between the output of the dehumidifier (13) and the intake of the regenerator (11).

7. A climate control system according to claim 5, in which the second circuit (B) includes two sub-circuits in which respective pumps generate respective flows of hygroscopic solution, with different volumes respectively, from a common tank (12) towards the regenerator (11) and the dehumidifier (13) respectively; the flows of hygroscopic solution coming from the regenerator (11) and the dehumidifier (13) respectively being returned to the said tank (12).

8. A climate control system according to claim 5, in which the said additional heat exchanger (2') is arranged upstream or downstream of the condenser (2).

9. A climate control system according to claim 5, in which the first circuit (A) includes an evaporator (16) arranged downstream of the said first heat exchanger (5) which connects the first and second circuits (A, B); the said evaporator (16) being arranged near the dehumidifier (13) of the second circuit (B), downstream thereof along the direction of the aforesaid second airflow which flows into the said dehumidifier (13) in operation.

\* \* \* \* \*